US008180468B2

(12) United States Patent
Matsuda et al.

(10) Patent No.: US 8,180,468 B2
(45) Date of Patent: May 15, 2012

(54) COMPUTER PROGRAM, INFORMATION REPRODUCTION DEVICE, AND METHOD

(75) Inventors: Hiroshi Matsuda, Saitama (JP); Kazuo Kamei, Saitama (JP); Keizo Sugita, Saitama (JP)

(73) Assignee: Pioneer Corporation, Tokyo (JP)

( * ) Notice: Subject to any disclaimer, the term of this patent is extended or adjusted under 35 U.S.C. 154(b) by 1048 days.

(21) Appl. No.: 11/994,430

(22) PCT Filed: Jun. 30, 2006

(86) PCT No.: PCT/JP2006/313067

§ 371 (c)(1),
(2), (4) Date: May 2, 2008

(87) PCT Pub. No.: WO2007/004540

PCT Pub. Date: Jan. 11, 2007

(65) Prior Publication Data

US 2009/0048694 A1 Feb. 19, 2009

(30) Foreign Application Priority Data

Jul. 1, 2005 (JP) ................................ 2005-194018

(51) Int. Cl.
*G06F 17/00* (2006.01)

(52) U.S. Cl. ........................................................ 700/94

(58) Field of Classification Search .................... 700/94; 84/484, 611, 612, 635, 636, 651, 652, 667, 84/668

See application file for complete search history.

(56) References Cited

U.S. PATENT DOCUMENTS

| | | | | |
|---|---|---|---|---|
| 7,105,735 | B2 * | 9/2006 | Senoo et al. | 84/612 |
| 7,737,353 | B2 * | 6/2010 | Sasaki et al. | 84/612 |
| 2001/0042434 | A1 * | 11/2001 | Yamada et al. | 84/484 |
| 2002/0172118 | A1 | 11/2002 | Yamada et al. | |
| 2004/0068401 | A1 | 4/2004 | Herre et al. | |

FOREIGN PATENT DOCUMENTS

| | | | |
|---|---|---|---|
| JP | 2000-047664 | A | 2/2000 |
| JP | 2001-243717 | A | 9/2001 |
| JP | 2002-207482 | A | 7/2002 |
| JP | 2002-287744 | A | 10/2002 |
| JP | 2002-341888 | A | 11/2002 |
| JP | 2003-085888 | A | 3/2003 |
| JP | 2003-263162 | A | 9/2003 |
| JP | 2004-198759 | A | 7/2004 |
| JP | 2004-528596 | A | 9/2004 |

OTHER PUBLICATIONS

International Search Report of PCT/JP2006/313067 filed Jun. 30, 2006, date of mailing Aug. 8, 2006.

* cited by examiner

*Primary Examiner* — Andrew C Flanders
(74) *Attorney, Agent, or Firm* — Young & Thompson

(57) ABSTRACT

A computer program makes a computer perform: a measuring process of measuring a beat candidate value, which is the number of beats of content per unit time; a reference setting process of setting a beat reference value according to a user's input; and a determining process of determining a beat definite value set in the vicinity of the beat reference value, from among the measured beat candidate value.

15 Claims, 12 Drawing Sheets

[FIG. 1]
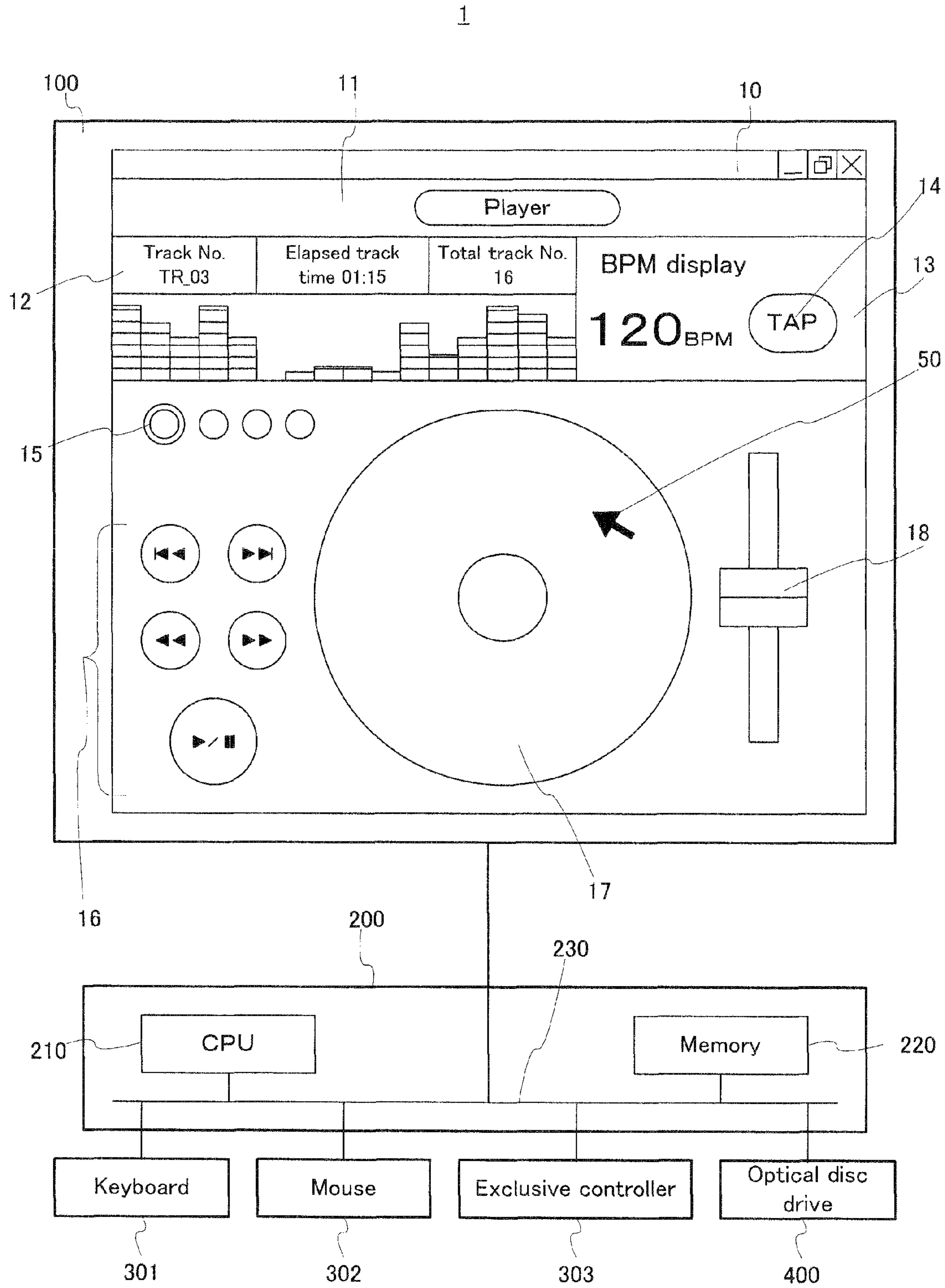

[FIG. 2]
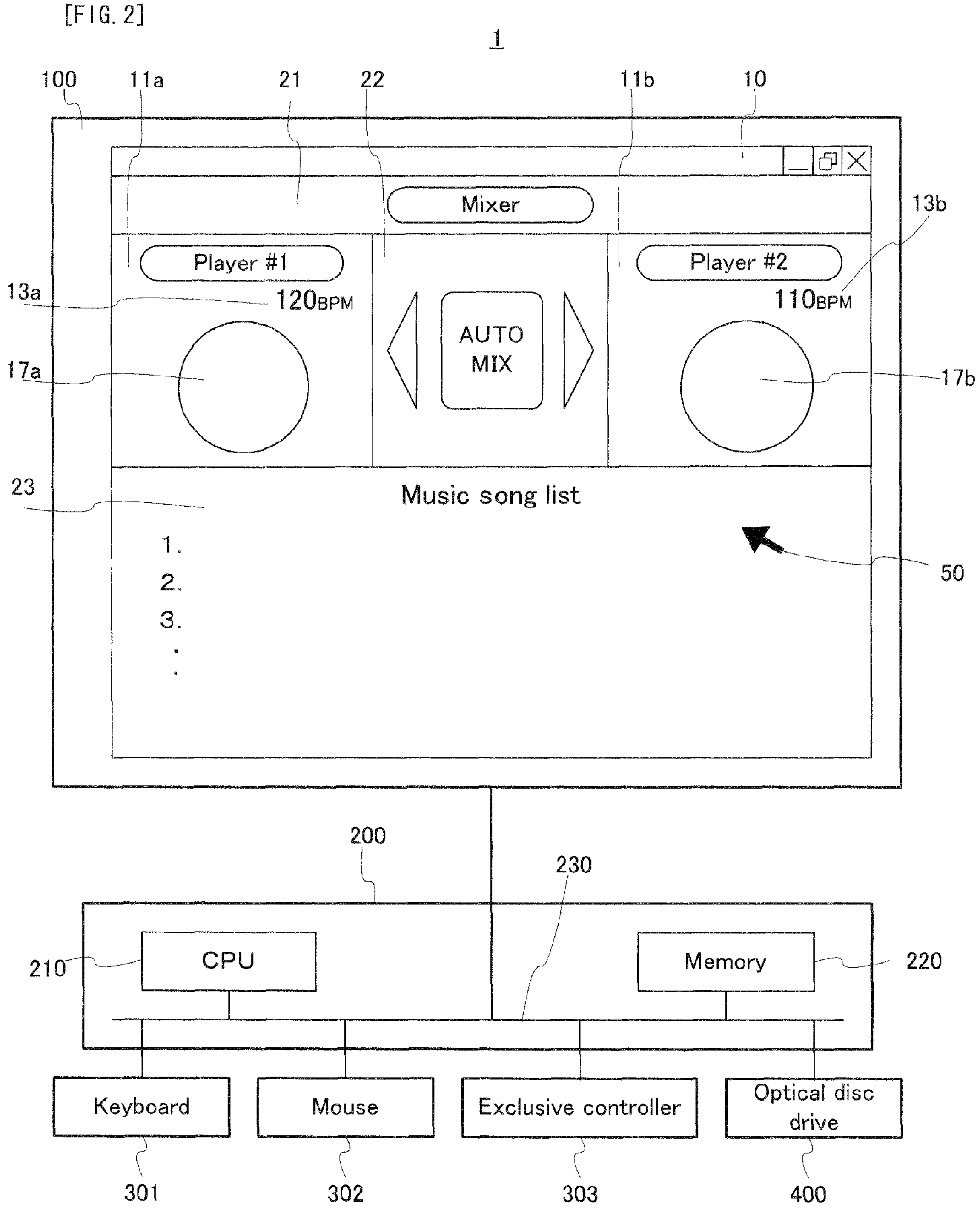

[FIG. 3]
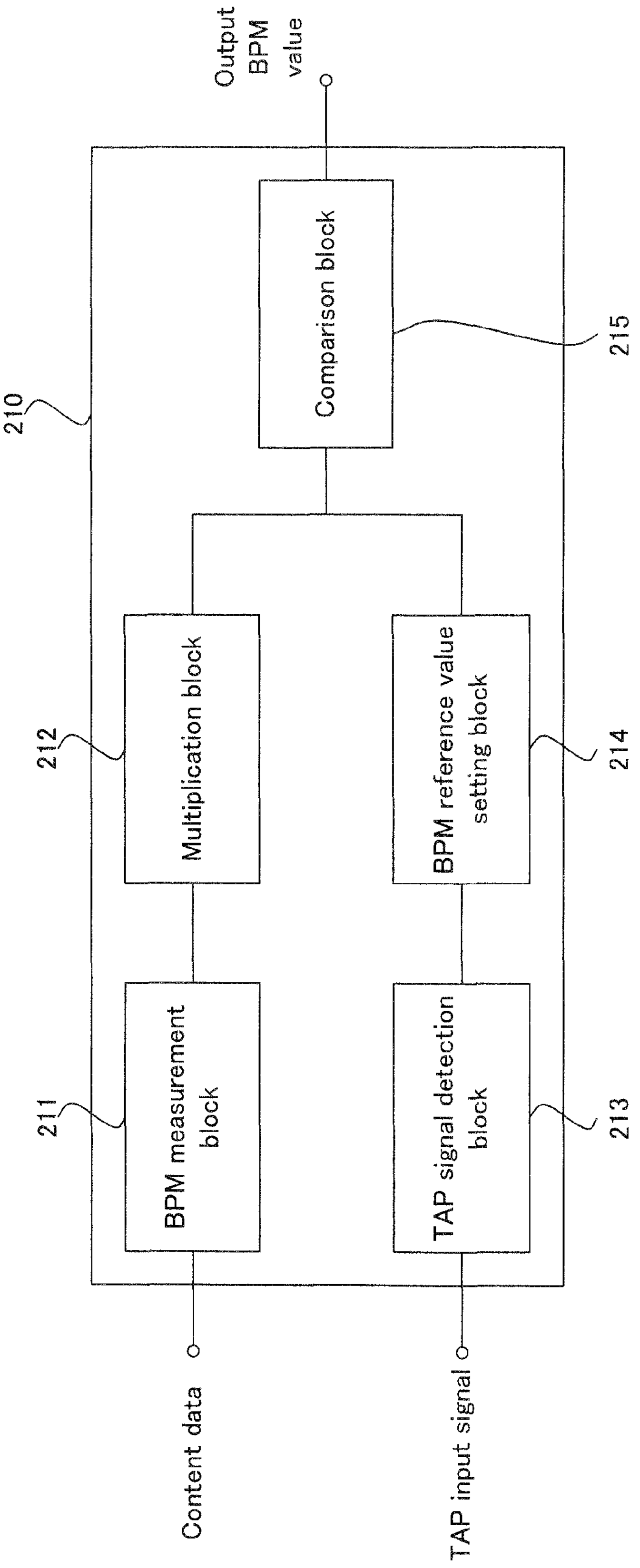

[FIG. 4]
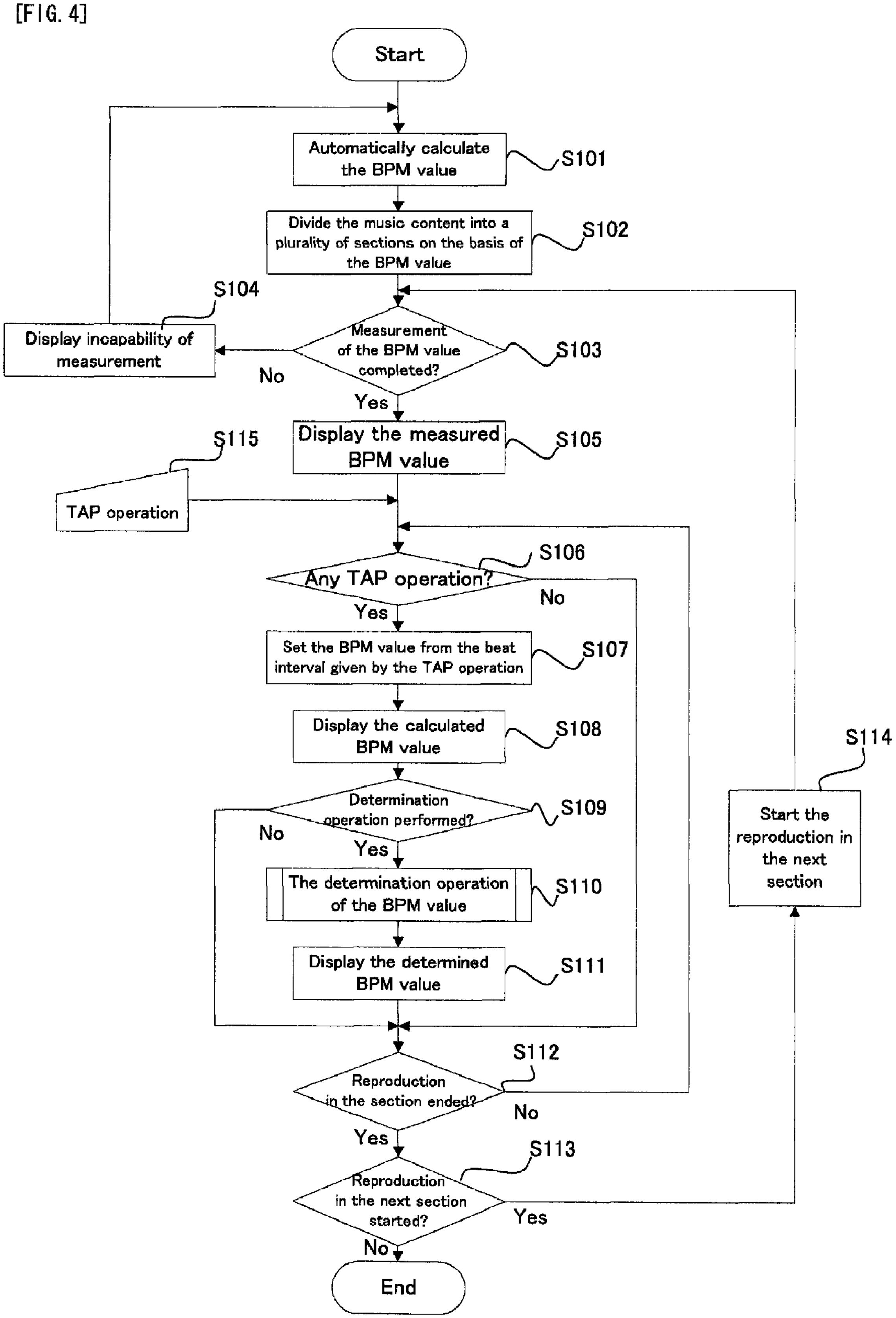

[FIG. 5]
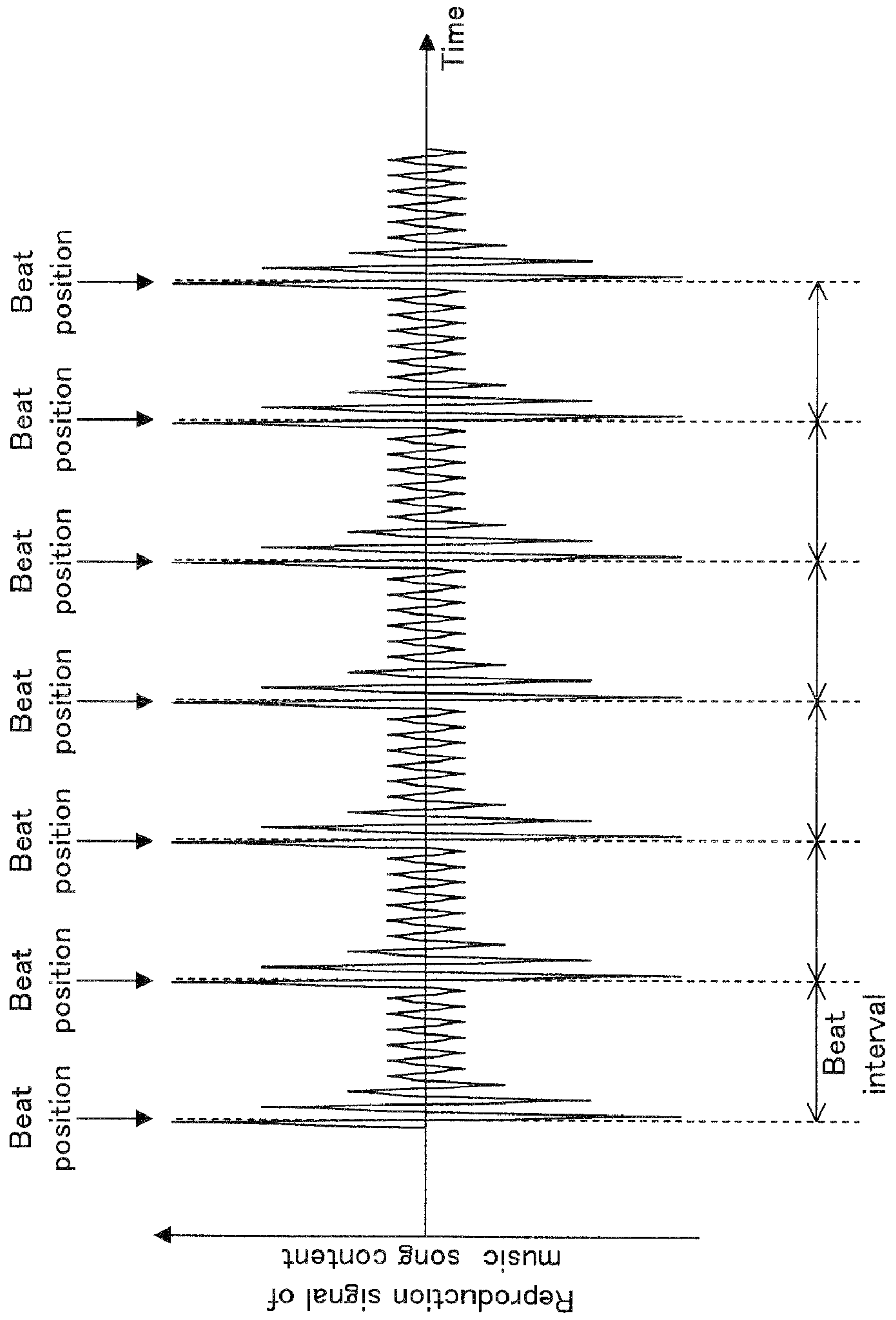

[FIG. 6]
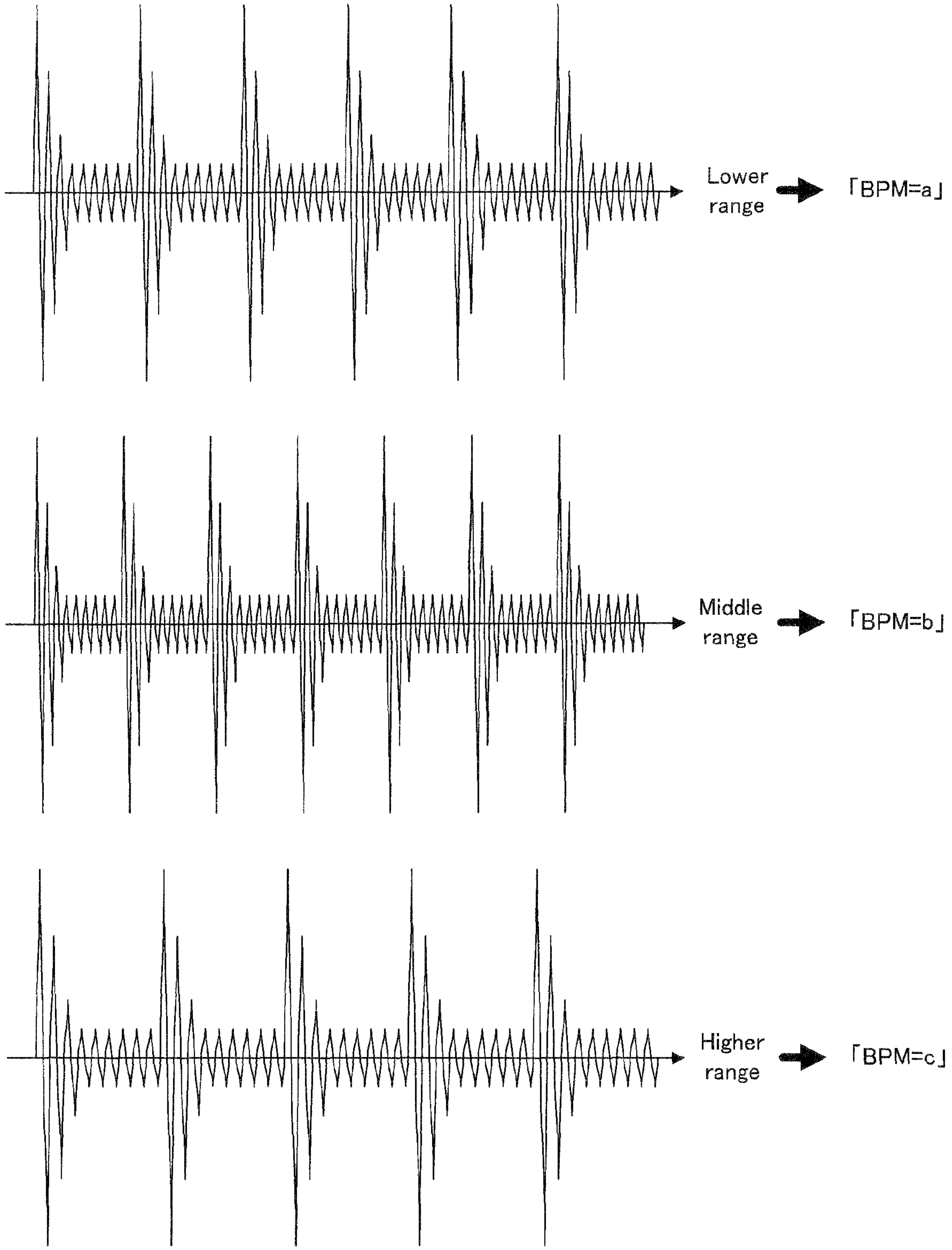

[FIG. 7]
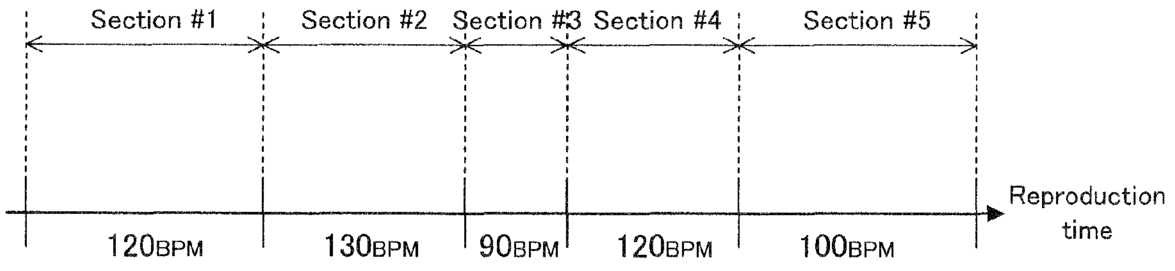

[FIG. 8]
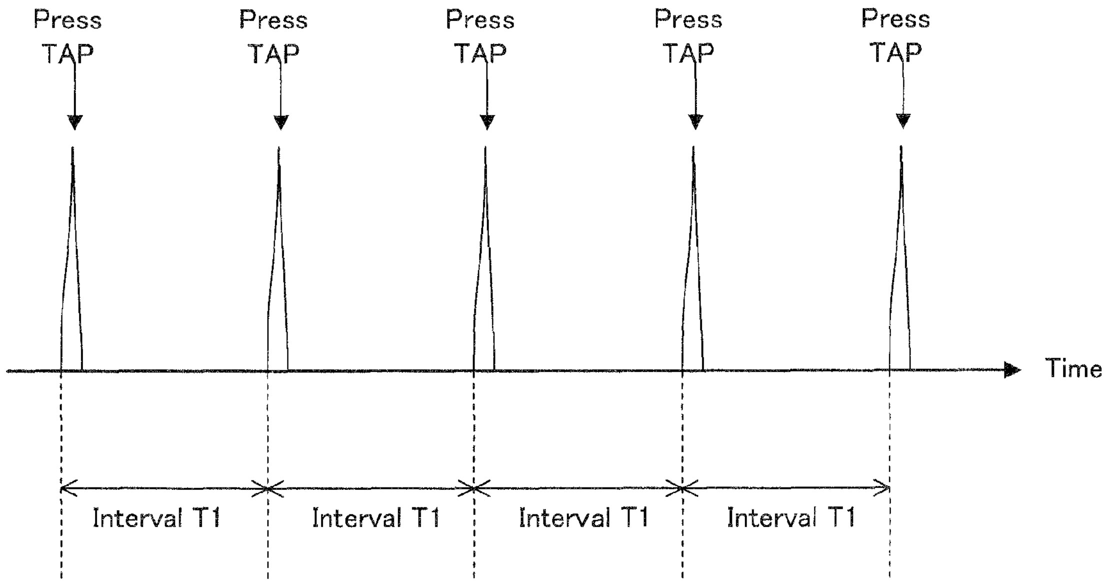
(a)
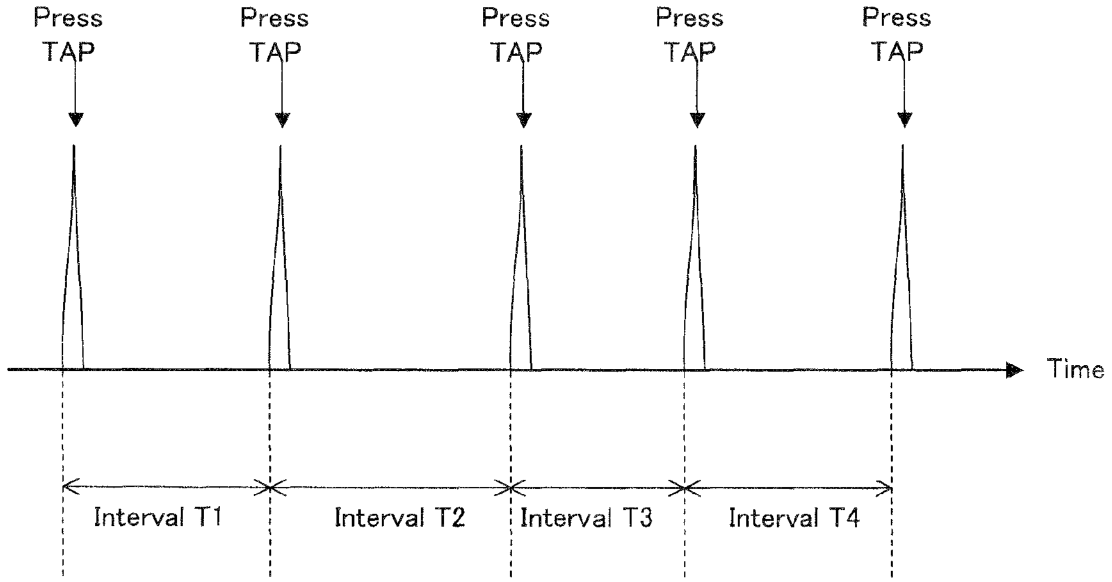
(b)

[FIG. 9]
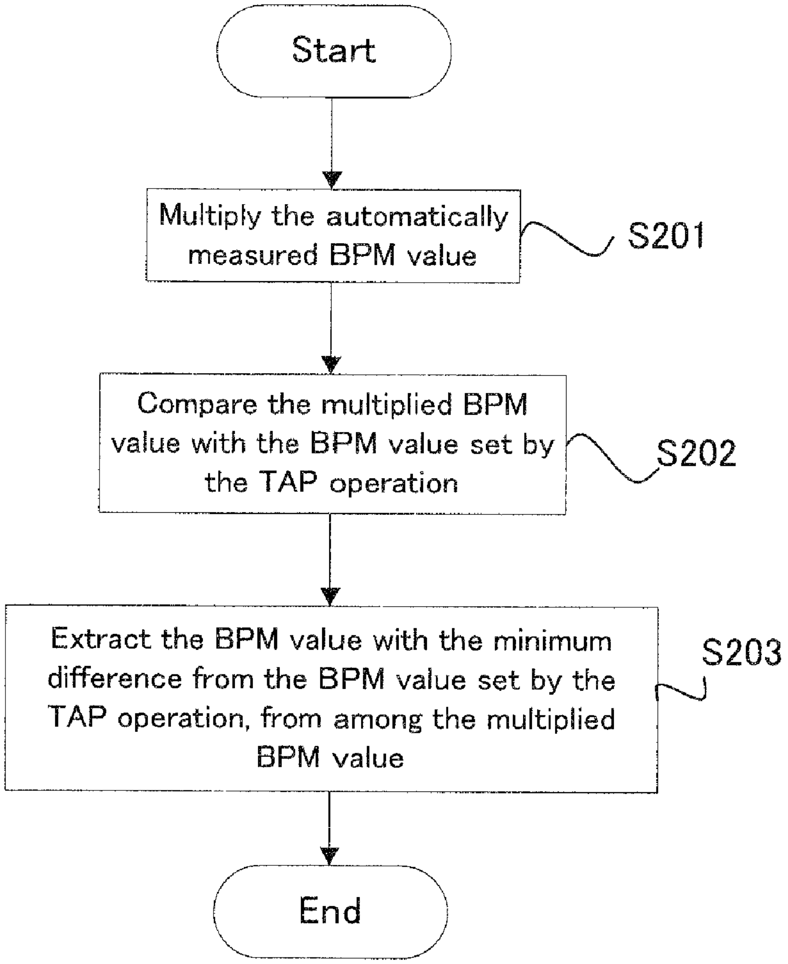

[FIG. 10]
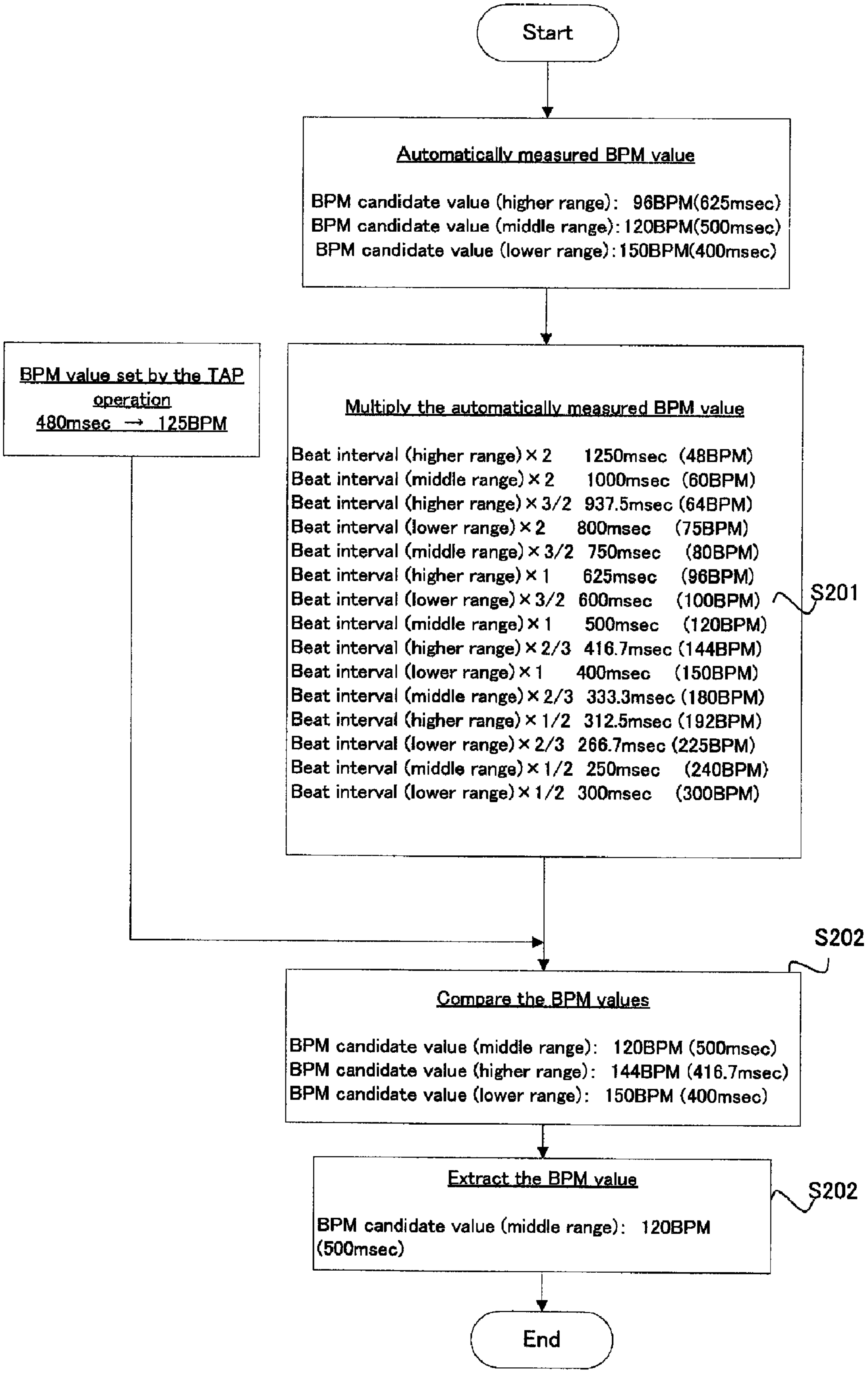

[FIG. 11]
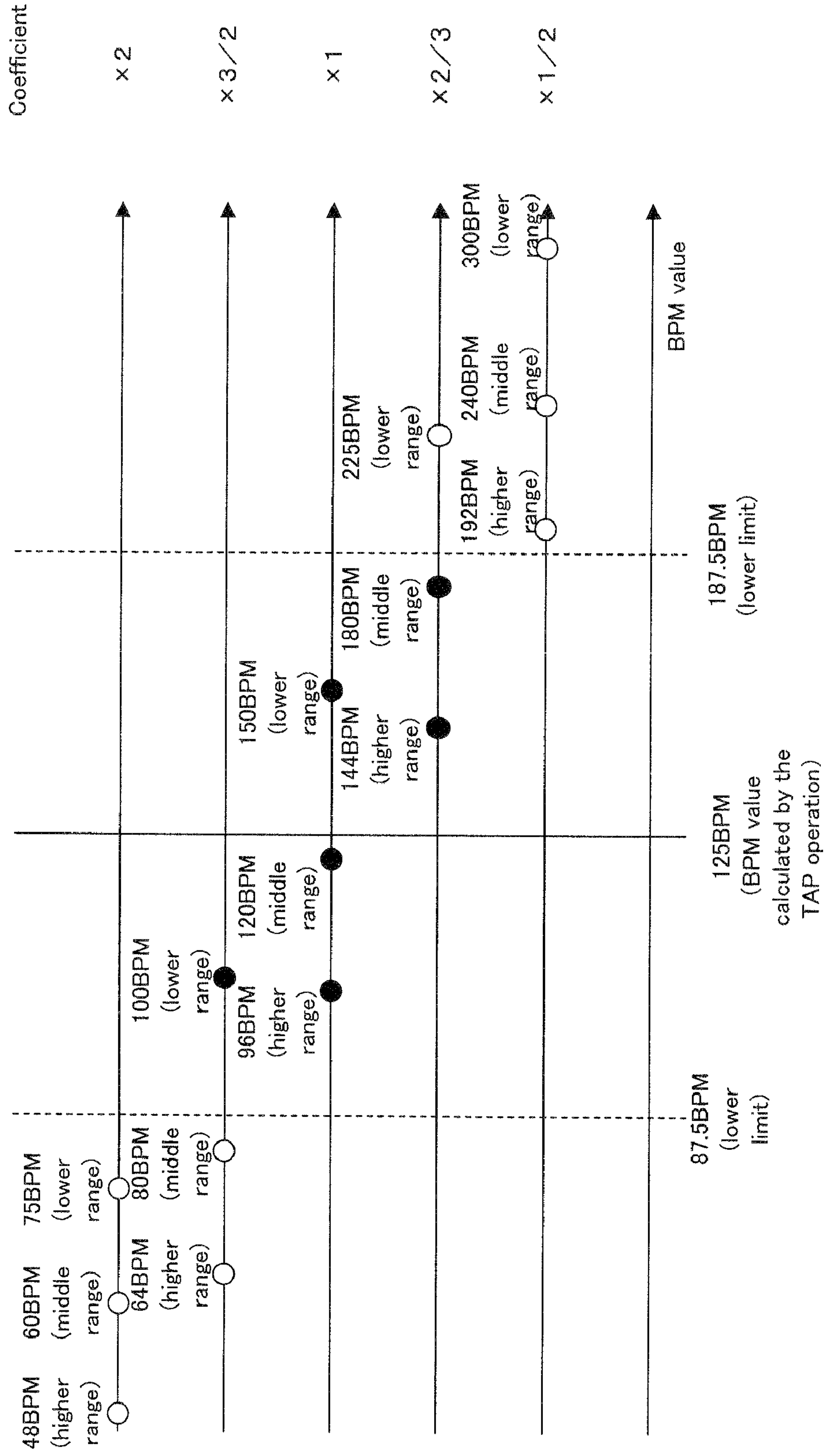

[FIG. 12]
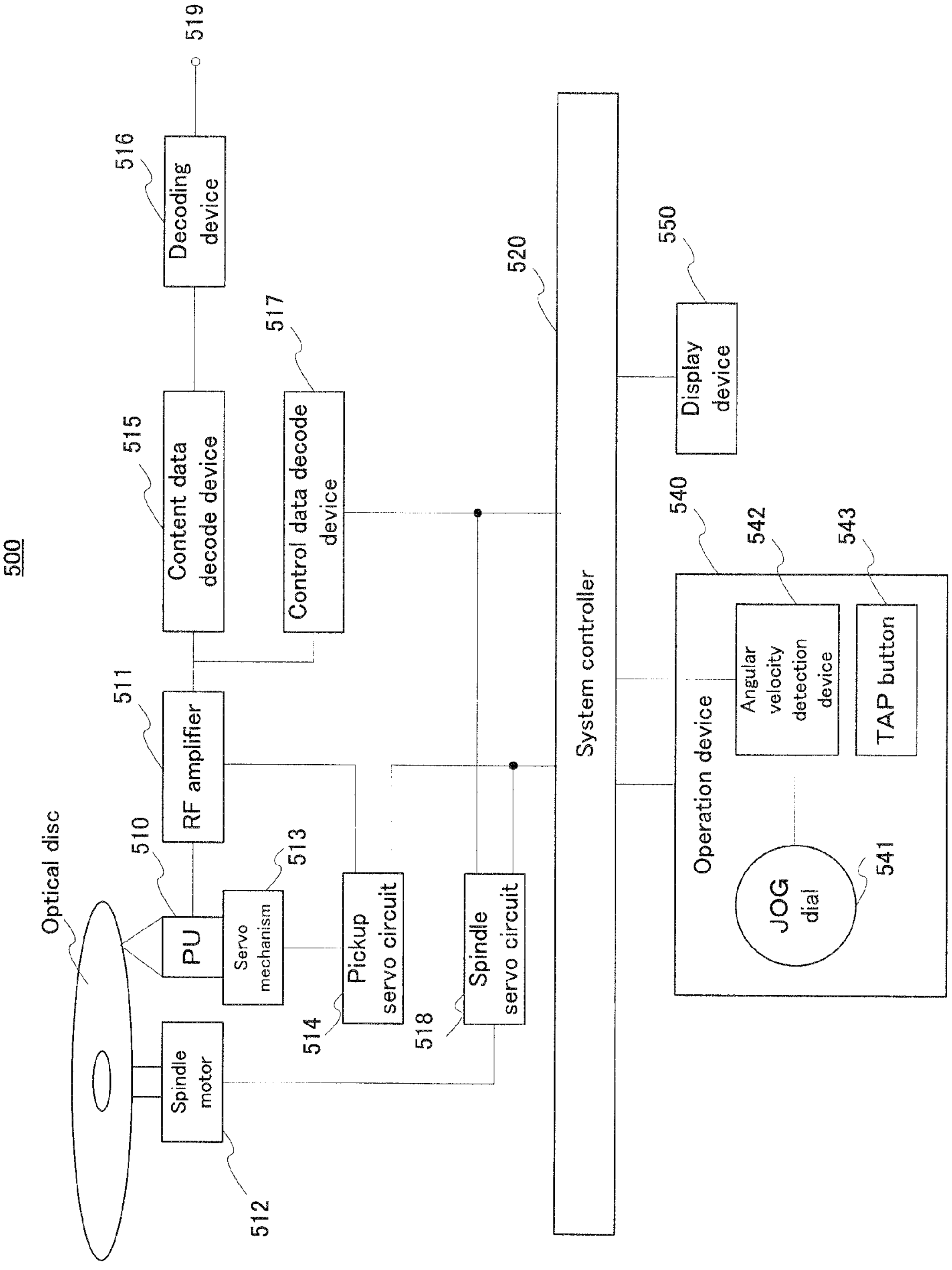

COMPUTER PROGRAM, INFORMATION REPRODUCTION DEVICE, AND METHOD

TECHNICAL FIELD

The present invention relates to a computer program which makes a computer function to reproduce a music song or the like recorded on a recording medium, and an information reproducing apparatus and method for reproducing the music song or the like recorded on the recording medium.

BACKGROUND ART

Currently, there are spread recording media, such as a CD and a DVD, on which data can be recorded and reproduced by using a digital signal. Along with that, an information reproducing apparatus for performing a unique reproduction process by using the digital signal has been also developed. For example, in the CD and the DVD, a plurality of music songs (i.e. content data) are recorded in association with each other. More specifically, for example, music songs each of which has a predetermined reproduction time is recorded as a plurality of data groups distinguished by a track number. Thus, the information reproducing apparatus can perform cue-playback in which the head address of each music song is searched for and then the music song is reproduced, random-playback in which the reproduction order of each music song is arbitrarily changed, and the like.

Moreover, by using two or more information reproducing apparatuses and continuously reproducing the music songs while matching the beat (or the beat position, interval, accentuation of the like) of the music songs to be reproduced on the respective information reproducing apparatuses, it is possible to reproduce two or more music songs as if they are one continuous music song, or it is possible to overlap the two or more music songs. That is, it is possible to reproduce a plurality of music songs, in a row or together without bothering an audience. Such an operation is generally referred to as a mixing operation. At this time, the beat of each music song is displayed on a display screen as a beat rate or the number of beats per unit time, expressed by e.g. an automatically measured BPM (Beat Per Minute) value. A user confirms the displayed beat rate and performs the aforementioned mixing operation.

For example, a patent document 1 discloses a technology of displaying the beat rate according to a change in a reproduction speed when the reproduction speed of the music song is changed by a user's operation with respect to the beat rate automatically measured and displayed on a display.

Patent document 1: Japanese Patent Laid Open No. 2001-243717

DISCLOSURE OF INVENTION

Subject to be Solved by the Invention

However, with regard to the beat rate which is extremely important from the viewpoint that it does not bother an audience in the mixing operation, there is such a technical problem that all the music songs cannot be always measured by the automatic measurement depending on the characteristics of the music songs. Moreover, there is also such a technical problem that the correct or highly accurate value of the beat rate cannot be always measured by the automatic measurement depending on the characteristics of the music songs. Specifically, for example, for a music song including a music song portion in which the beat is so weak that an audio waveform which indicates the beat becomes small and in which it cannot be recognized as the beat in the automatic measurement, there is a high possibility that the beat rate is not measured by the automatic measurement. And, for example, for a musing song including a music song portion in which it is hard to extract a regular-interval pattern because the beat interval is irregular, there is a high possibility that the beat rate is not measured by the automatic measurement. Moreover, even if the beat rate can be measured by the automatic measurement, a value including an error, such as ½ times, twice, and ⅔ times of the correct or highly accurate beat rate, is possibly measured, because the beat is overlooked or it is falsely recognized that there is the beat or for similar reasons.

As described above, since the automatically measured beat rate is not necessarily a reliable value, the mixing operation based on the display of the beat rate which is not necessarily reliable likely gives an uncomfortable feeling to the user.

The subject to be solved by the present invention includes the above-exemplified problems as one example. It is therefore an object of the present invention to provide a computer program and an information reproducing apparatus and method which can present a more correct beat rate to a user.

Means for Solving the Subject

Computer Program

The above object of the present invention can be achieved by a computer program for making a computer perform: a measuring process of measuring a beat candidate value, which is the number of beats of content per unit time; a reference setting process of setting a beat reference value according to a user's input (i.e. an input from a player who plays the content); and a determining process of determining a beat definite value set in the vicinity of the beat reference value, from among the measured beat candidate value.

According to the computer program of the present invention, an information reproducing apparatus (specifically, the information reproducing apparatus of the present invention described later) can be relatively easily realized as a computer reads and executes the computer program from a program storage device, such as a ROM, a CD-ROM, a DVD-ROM, and a hard disk, or as it executes the computer program after downloading the program through a communication device.

Specifically, the computer program of the present invention makes the computer perform: the measuring process; the reference setting process; and the determining process. By performing the measuring process on the computer, the beat candidate value is measured, which is the number of beats per unit time (i.e. beat rate), of the content which is a reproduction target by the information reproducing apparatus realized on the computer by executing the computer program. That is, the beat candidate value is automatically calculated without through the user of the computer on which the computer program of the present invention is executed. Incidentally, the beat candidate value measured here possibly includes a constant error because of an error or the like in the measurement in the measuring process. On the other hand, the beat reference value is set by performing the reference setting process on the computer. The beat reference value is set in accordance with the user's input (or a parameter based on the input) for the computer on which the computer program of the present invention is executed. Specifically, for example, the user's input may be set directly as the beat reference value. Alternatively, a predetermined operation or calculation or the like is performed on the user's input to thereby set the beat reference value. After that, by performing the determining process on the computer, the beat definite value set in the vicinity of the beat reference value, from among the beat candidate value measured in the measuring process is determined to be the beat definite value that is presented to the user in the end as the beat rate of the content which is a reproduction target.

As described above, by using the beat reference value set in accordance with the user's input, it is possible to present the beat definite value which indicates the more correct or highly accurate beat rate, to the user. In particular, if the beat candidate value automatically measured in the measuring process does not meet the user's expectation (i.e. if the more correct or highly accurate beat rate is not measured) or in similar cases, the user who reproduces the content while listening to it performs an input in accordance with the characteristic of the content, to thereby set the beat reference value according to the characteristic of the content. As a result, it is possible to set the beat definite value presented to the user in the end, to the value that meets the user's expectation. In this regard, the computer program of the present invention is particularly effective. Moreover, it is possible to present the beat definite value which indicates the more correct or highly accurate beat rate, to the user, without depending on the characteristic of the content (specifically, the characteristic of the content including a music song or the like). By this, it is possible to reproduce the plurality of contents in a row or with them overlapping, without bothering the user by an uncomfortable feeling, in a mixing operation.

In one aspect of the computer program of the present invention, the determining process determines the beat definite value set in a range of an upper limit to a lower limit, the upper limit and the lower limit being set on the basis of the beat reference value.

According to this aspect, it is possible to determine the beat definite value in the range of the upper limit to the lower limit set on the basis of the beat reference value. As a result, it is possible to set the beat definite value presented to the user in the end, to the value that meets the user's expectation, and it is possible to present the beat definite value which indicates the more correct or highly accurate beat rate, to the user.

In one aspect of the computer program of the present invention, the measuring process measures a plurality of beat candidate values in each of frequency bands of the content (specifically, for example, in each of a higher-frequency-range, a middle-frequency-range, and a lower-frequency-range), and the determining process determines a beat candidate value having a minimum difference from the beat reference value from among the plurality of beat candidate values, as the beat definite value.

According to this aspect, it is possible to determine the beat definite value which indicates the more correct or highly accurate beat rate, from among the plurality of beat candidate values measured in each of the frequency bands.

In another aspect of the computer program of the present invention, it further makes the computer perform a correcting process of correcting the beat candidate value, to thereby generate a new beat candidate value.

According to this aspect, the aforementioned operation can be performed, for example, by using the new beat candidate value generated by correcting the beat candidate value automatically measured in the measuring process. As a result, it is possible to present the beat definite value which indicates the more correct or highly accurate beat rate, to the user, by eliminating an adverse influence, such as a measurement error, in the measurement of the beat candidate value automatically measured in the measuring process.

Incidentally, the correcting process may be performed when the beat candidate value is measured in the measuring process, or when the beat definite value is determined in the determining process. Alternatively, it may be performed in other timing. The point is that the correcting process can be performed in any timing as long as the beat definite value can be preferably determined in the determining process.

In an aspect of the computer program which makes the computer perform the correcting process, as described above, the correcting process may correct the beat candidate value, if needed, on the basis of a relationship between the beat candidate value and the beat reference value.

By virtue of such construction, it is unnecessary to correct the beat candidate value needlessly, and it is possible to increase a processing speed and to reduce a load associated with the execution of the computer program. More specifically, if a predetermined condition is satisfied, such as a condition that the beat candidate value and the beat reference value are significantly different, the beat candidate value is corrected if needed. If the predetermined condition is not satisfied, the beat candidate value does not have to be corrected even if the correcting process is performed by the computer.

In an aspect of the computer program which makes the computer perform the correcting process, as described above, the correcting process multiplies the beat candidate value measured in the measuring process by a predetermined coefficient, to thereby generate the new beat candidate value.

By virtue of such construction, the beat definite value can be determined from among the automatically measured beat candidate value and the new beat candidate value generated by multiplying the beat candidate value by the predetermined coefficient. Therefore, even if the beat rate can be measured by the automatic measurement, it is possible to preferably avoid such a disadvantage that the value including an error, such as ½ times, twice, and ⅔ times of the correct or highly accurate beat rate, is possibly presented to the user because the beat is overlooked or it is falsely recognized that there is the beat or for similar reasons.

In an aspect of the computer program in which the multiplication is performed by the predetermined coefficient, as described above, the predetermined coefficient is at least one of ½, ⅔, 1, 3/2, and 2.

By virtue of such construction, even if the beat rate can be measured by the automatic measurement, it is possible to preferably avoid such a disadvantage that the value including an error, such as ½ times, twice, and ⅔ times of the correct or highly accurate beat rate, is possibly presented to the user because the beat is overlooked or it is falsely recognized that there is the beat or for similar reasons.

In another aspect of the computer program of the present invention, the user's input is a pulse outputted by pressing an operation key a plurality of times in desired timing, and the reference value setting process sets an inverse number of an average cycle of the pulse, as the beat reference value.

According to this aspect, it is possible to preferably set the beat reference value in accordance with the user's input. In particular, by the user pressing the operation key the plurality of times in desired timing, the user's input is outputted to the computer. Thus, if the user who reproduces the content while listening to it presses the operation key in accordance with the reproduction of the content or the beat of the content, it is possible to preferably set the beat reference value according to the actual content, relatively easily and preferably.

In an aspect of the computer program in which the beat definite value set in the range of the upper limit to the lower limit is determined, as described above, a ratio between each of the upper limit and the lower limit and the beat reference value may be set to be fixed.

By virtue of such construction, an acceptable range (i.e. each of the upper limit and the lower limit) of the beat definite value can be preferably set. As a result, it becomes easy to determine the beat definite value.

In an aspect of the computer program in which the beat definite value set in the range of the upper limit to the lower limit is determined, as described above, a ratio between each of the upper limit and the lower limit and the beat reference value may be set to be variable.

By virtue of such construction, the acceptable range (i.e. each of the upper limit and the lower limit) of the beat definite value can be preferably set in accordance with the characteristic of the content or the like. As a result, it becomes easy to determine the beat definite value.

In an aspect of the computer program in which the ratio between each of the upper limit and the lower limit and the beat reference value is set to be variable, the computer program further may make the computer perform a ratio setting process of setting the ratio.

By virtue of such construction, the acceptable range (i.e. each of the upper limit and the lower limit) of the beat definite value can be preferably set in accordance with the characteristic of the content or the like. As a result, it becomes easy to determine the beat definite value.

In another aspect of the computer program of the present invention, the upper limit is set by adding M % (wherein M is a positive real number) of the beat reference value to the beat reference value, and the lower limit is set by subtracting N % (wherein N is a positive real number) of the beat reference value from the beat reference value.

According to this aspect, the acceptable range (i.e. each of the upper limit and the lower limit) of the beat definite value can be preferably set in accordance with the characteristic of the content or the like. As a result, it becomes easy to determine the beat definite value.

In another aspect of the computer program of the present invention, it further makes the computer perform a dividing process of dividing the content into a plurality of sections along a time axis, on the basis of the beat candidate value, the determining process determining the beat definite value in each of the divided sections.

According to this aspect, the aforementioned operation can be performed distinctly in each of the divided sections. Therefore, even in the case of the content in which the beat rate changes in one content, it is possible to present the beat definite value which indicates the more correct or highly accurate beat rate in any part of the content, to the user.

In another aspect of the computer program of the present invention, it further makes the computer perform a displaying process of displaying the beat definite value.

According to this aspect, it is possible to preferably present the beat definite value to the user.

In another aspect of the computer program of the present invention, it further makes the computer perform a changing process of changing an operation in the determining process such that the beat reference value is determined to be the beat definite value in the determining process.

According to this aspect, if it is not desired to correct the beat candidate value on the basis of the beat reference value or if it is not desired to automatically measure the beat rate because the user has an excellent or skilled ability or in similar cases, it is possible to present the beat reference value according to the user's input, as the beat definite value. Therefore, it is possible to preferably change the operation of the computer on which the computer program is read, in accordance with the user's skill or preference.

In another aspect of the computer program of the present invention, the content includes music song content.

According to this aspect, the aforementioned operation can be performed on the content including the music song content.

The above object of the present invention can be achieved by a computer program product in a computer in a computer-readable medium for making a computer perform: a measuring process of measuring a beat candidate value, which is the number of beats of content per unit time; a reference setting process of setting a beat reference value according to a user's input (i.e. an input from a player who plays the content); and a determining process of determining a beat definite value set in the vicinity of the beat reference value, from among the measured beat candidate value.

According to the computer program product of the present invention, an information reproducing apparatus (specifically, the information reproducing apparatus of the present invention described later) can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as an information reproducing apparatus (specifically, the information reproducing apparatus of the present invention described later).

(Information Reproducing Apparatus)

The above object of the present invention can be also achieved by an information reproducing apparatus provided with: a measuring device for measuring a beat candidate value, which is the number of beats of content per unit time; a reference setting device for setting a beat reference value according to a user's input; and a determining device for determining a beat definite value set in the vicinity of the beat reference value, from among the measured beat candidate value.

According to the information reproducing apparatus of the present invention, it is possible to receive the same various benefits as those of the computer program of the present invention described above.

Incidentally, in response to the various aspects of the aforementioned computer program of the present invention, the information reproducing apparatus of the present invention can employ various aspects.

In one aspect of the information reproducing apparatus of the present invention, it is further provided with an inputting device for receiving the user's input.

According to this aspect, it is possible to preferably set the beat reference value in accordance with the user's input inputted by the inputting device.

As described above, the inputting device may be provided with an operation key which can be pressed a plurality of times in desired timing.

By virtue of such construction, if the user who reproduces the content while listening to it presses the operation key in accordance with the reproduction of the content or the beat of the content, it is possible to preferably set the beat reference value according to the actual content, relatively easily and preferably.

(Information Reproducing Method)

The above object of the present invention can be also achieved by an information reproducing method provided with: a measuring process of measuring a beat candidate value, which is the number of beats of content per unit time; a reference setting process of setting a beat reference value according to a user's input; and a determining process of determining a beat definite value set in the vicinity of the beat reference value, from among the measured beat candidate value.

According to the information reproducing method of the present invention, it is possible to receive the same various benefits as those of the information reproducing apparatus of the present invention described above.

Incidentally, in response to the various aspects of the aforementioned information reproducing apparatus of the present invention, the information reproducing method of the present invention can employ various aspects.

These effects and other advantages of the present invention will become more apparent from the following embodiments.

As explained above, according to the computer program of the present invention, it makes a computer perform: the measuring process; the reference setting process; and the determining process. Moreover, according to the information reproducing apparatus of the present invention, it is provided with: the measuring device; the reference setting device; and the determining device. Moreover, according to the information reproducing method of the present invention, it is provided with: the measuring process; the reference setting process; and the determining process. Therefore, it is possible to present the more correct or highly accurate beat rate, to the user.

BRIEF DESCRIPTION OF DRAWINGS

FIG. 1 is a block diagram generally showing the basic structure of an optical disc reproduction system in an embodiment.

FIG. 2 is a block diagram generally showing the basic structure of an optical disc reproduction system in an embodiment.

FIG. 3 is a block diagram conceptually showing functional blocks realized in a computer provided for the optical disc reproduction system in the embodiment.

FIG. 4 is a flowchart conceptually showing a flow of the operations of the optical disc reproduction system in the embodiment.

FIG. 5 is a graph conceptually showing a reproduction waveform of content data.

FIG. 6 is a graph conceptually showing a reproduction waveform of the content data divided in each frequency band.

FIG. 7 is an explanatory diagram conceptually showing the aspect that the entire content data is divided into a plurality of reproduction sections on the basis of a BPM candidate value.

FIG. 8 are graphs conceptually showing waveforms of a detection signal by a TAP operation.

FIG. 9 is a flowchart conceptually showing a flow of correction of the BPM candidate value.

FIG. 10 is a flowchart showed by using specific values in the flowchart shown in FIG. 9.

FIG. 11 is a graph generally showing the BPM candidate value, a BPM reference value, and a numerical relationship between an upper limit and a lower limit set on the basis of the BPM reference value.

FIG. 12 is a block diagram conceptually showing the basic structure of an optical disc reproducing apparatus in an embodiment.

DESCRIPTION OF REFERENCE CODES

1 optical disc reproduction system
10 display window
13 BPM display portion
14 TAP button
17 jog dial
100 display
200 computer
201 CPU
211 BPM measurement block
212 multiplication block
213 TAP signal detection block
214 BPM reference value setting block
215 comparison block
500 optical disc reproducing apparatus

BEST MODE FOR CARRYING OUT THE INVENTION

Hereinafter, the best mode for carrying out the invention will be explained in each embodiment in order, with reference to the drawings.

Incidentally, in the following embodiments, the computer program of the present invention is applied to a computer program for realizing, on a computer, an optical disc reproducing apparatus, such as a CD player and a DVD player, with various reproduction functions represented by reproduction speed control, tempo control, and rewind reproduction and the like. Therefore, in the following embodiments, an explanation will be given on the structure and operation of a computer in which such a computer program is read (more specifically, an optical disc reproduction system provided with such a computer).

Incidentally, the computer in which such a computer program is read (more specifically, the optical disc reproduction system provided with such a computer) functions as an optical disc reproducing apparatus, and such an optical disc reproducing apparatus corresponds to one specific example of the information reproducing apparatus of the present invention. Moreover, the optical disc reproduction system in the embodiment explained below is used as DJ equipment (including VJ (Video Jockey) equipment) used in adding various special effects to music data or video data and continuously reproducing the data while changing optical discs one after another at a dance place, such as a disco.

(1) Basic Structure

Firstly, with reference to FIG. 1 to FIG. 3, the basic structure of the optical disc reproduction system in the embodiment will be explained. Each of FIG. 1 and FIG. 2 is a block diagram generally showing one basic structure of the optical disc reproduction system in the embodiment. FIG. 3 is a block diagram conceptually showing functional blocks realized in a computer provided for the optical disc reproduction system in the embodiment.

As shown in FIG. 1, an optical disc reproduction system 1 in the embodiment is provided with: a display 100; a computer 200; a keyboard 301; a mouse 302; an exclusive controller 303; and an optical disc drive 400.

The display 100 includes, for example, a LCD (Liquid Crystal Display), a cathode-ray tube display, or the like, and it is adapted to display a predetermined display window 10 in accordance with an instruction from the computer 200.

In FIG. 1, in particular, the display window 10 displays a player menu 11 which has an appearance of a player or the like used as the DJ equipment. The player menu 11 displays a waveform display portion 12, a BPM display portion 13, a TAP button 14, an indicator 15, an operation key 16, a jog dial 17, a slider 18, and a mouse pointer 50.

The waveform display portion 12 displays various information according to the reproduction of content data including a music song. For example, the r waveform display portion 12 displays, on the top, a truck number of currently reproduced content data, an elapsed time of the currently reproduced content data (i.e. a current reproduction time), the total track number of the content data recorded on an optical disc currently loaded on the optical disc drive 400, and the like. In an example of the display shown in FIG. 1, it is possible to recognize that the content data with a track number of 3 is currently reproduced, that 1 minute 15 seconds has elapsed since the reproduction start, and that the total track number of the content data recorded on the optical disc loaded on the optical disc drive 400 is "16.

Moreover, the waveform display portion 12 wave-displays, on the bottom, a beat density of the content data along a reproduction time axis. Alternatively, it may wave-display signal intensity in each frequency band of the currently reproduced content data.

Of course, the display content on the waveform display portion 12 shown in FIG. 1 is one specific example. It is obvious that other various information or the like may be displayed.

The BPM display portion 13 displays a BPM value which indicates the number of beats per unit time of the currently reproduced content data. The BPM value displayed on the BPM display portion 13 may be a BPM value automatically measured by the operation of the computer 200, or a BPM value inputted to the optical disc reproduction system 1 by a user (i.e. a user of the optical disc reproduction system, specifically a DJ or the like) which presses the TAP button 14. Alternatively, as descried later, it may be a BPM value obtained by correcting the automatically measured BPM value or the like, on the basis of the BPM value inputted by pressing the TAP button 14.

The TAP button 14 is constructed as a display button which can be pressed by a click operation or the like with the pointer 50 which arbitrarily moves in a screen of the display 100 by operating the keyboard 301 and the mouse 302 or the like. By pressing the TAP button 14, the user can input the BPM value to the optical disc reproduction system 1. Moreover, by pressing the TAP button 14, it is possible to input a BPM value which is a reference when the automatically measured BPM value is corrected or the like, to the optical disc reproduction system 1, as described later.

The indicator 15 is constructed as an icon or the like which indicates the operational state of the optical disc reproduction system 1 and the reproduction state of the content data or the like, by blinking light or the like.

The operation key 16 is constructed as a display button which can be pressed by the click operation or the like with the pointer 50. By pressing the operation key 16, the operation of the optical disc reproduction system 1 can be changed. That is, it is possible to control the reproduction of the content data, fast-forward, rewind, pause, stop, or the like by the user performing the click operation with the pointer 50 placed on the desired operation key 16.

The jog dial 17 is constructed as a disc-shaped display button which can rotate in both directions by a drag operation or the like with the pointer 50 or the like. If the user or the like changes and operates the rotational direction and the rotational speed of the jog dial 17 with the pointer 50 as occasion demands, it is possible to set the forward reproduction and reverse reproduction of the content data in accordance with the rotational direction. Moreover, in accordance with the rotational speed, the tone of a reproduction sound reproduced on a speaker and a head phone can be changed.

Incidentally, the aforementioned forward reproduction indicates that the content data of the optical disc is reproduced in the recording order as in the case an analog record, such as a LP, is rotated in a forward direction to play music or the like. Therefore, music or the like is reproduced as a normal sound in accordance with the rotation of the jog dial 17 in a clockwise direction. Moreover, the forward reproduction is also performed even when the jog dial 17 is stopped.

On the other hand, the aforementioned reverse reproduction indicates that the content data of the optical disc is reproduced in an opposite order to the recording order as in the case that the analog record is rotated in an opposite direction to play music or the like. That is, since music or the like is continuously recorded (i.e. analog-recorded) in the analog record, if the analog record is rotated in the opposite direction, the music or the like is reproduced in the opposite direction, so that a sound different from the original music or the like is reproduced. If the jog dial 17 is rotated in a counter clockwise direction, the same sound as if the analog record were rotated and played in the opposite direction can be generated by reproducing the individual content data digital-recorded on the optical disc in the opposite order.

Since the same function as that in the reverse reproduction of the analog record is provided, it is possible to generate an imitation sound referred to as a so-called scratch sound (an imitation sound such as squeak and crash) if the user or the like repeats the reciprocating rotation of the jog dial 17 quickly in the clockwise direction and in the counter-clockwise direction. Then, when a player referred to as a so-called disc jockey operates the jog dial 17 to generate the aforementioned scratch sound or the like, it is possible to perform editing to generate rap music or the like by using a CD and a DVD.

The slider 18 is constructed as a display button which can be slid vertically by the drag operation or the like with the pointer 50. By the user or the like vertically displacing the slider 18 with the pointer 50, it is possible to change the reproduction speed of the content data, as occasion demands. For example, the reproduction speed of the content data can be relatively increased by displacing the slider 18 upward, and the reproduction speed of the content data can be relatively reduced by displacing the slider 18 downward.

The computer 200 reproduces the content data recorded in the optical disc loaded on the optical disc drive 400 in various aspects in accordance with instruction from the keyboard 301, the mouse 302, the exclusive controller 303 or the like. Moreover, it also performs a drawing process of the display window 10 with respect to the display 100. Specifically, these processes are performed by the operation of a CPU 201, and a program or the like necessary for the operation of the CPU 201 is stored in a memory 220. Moreover, the memory 220 is also used to temporarily store various variables and parameters or the like used when the CPU 201 operates, or to temporarily store the content data. Moreover, the data input/output between the CPU 201 and the memory 202 in the computer 200, and the data input/output between those devices and display 100, the keyboard 301, the mouse 302, the exclusive controller 303, and the optical disc drive 400 are performed through a data bus 230.

The keyboard 301 is provided with various operation keys which can be pressed directly by the user. By the user pressing the operation key of the keyboard 301, the computer 200 can perform various functions assigned to each operation key. For example, if a "P" button as the operation key is pressed the computer 200 may operate to start (or Play) the reproduction of the content data. Alternatively, if an "S" button as the operation key is pressed, the computer 200 may operate to Stop the reproduction of the content data.

The mouse 302 displaces the pointer 50 displayed on the display 100, in a screen of the display 100, in accordance with the direct operation amount or the like of the mouse 302 by the user. Moreover, by the user directly pressing a click button attached to the mouse 302, it is possible to perform the click operation, the drag operation, or the like. Incidentally, it is obvious that the operation of the mouse 302 may be alternately performed by the keyboard 301.

The exclusive controller 303 is provided with substantially the same physical operation key or the like as the display content of the player menu 11 displayed in the display window 10. By the user directly operating the physical operation key provided for the exclusive controller 303, the user can perform a smooth operation as if the user directly operated the play menu 11.

The optical disc drive 400 loads the optical disc on which the content data is recorded, reads the content data, and transfers the read content data to the computer 200.

As shown in FIG. 2, the optical disc reproduction system 1 in the embodiment can also display a mixer menu 21 in the display window 10, instead of or in addition to the player menu 11.

The mixer menu 21 displays a first player menu 11*a*, a second player menu 11*b*, a mixer operation portion 22, and a music song list display portion 23.

The mixer operation portion 22 includes a display button or the like which can perform an operation to mix the content data which is a reproduction target in the first player menu 11*a* with the content data which is a reproduction target in the second player menu 11*b*. The user performs mixing with reference to a music song list displayed on the music song list display portion 23, the BPM value displayed on each of the BPM display portion 13*a* in the first player menu 11*a* and the BPM display portion 13*b* in the second player menu 11*b*.

As explained above, the optical disc reproduction system in the embodiment can realize the DJ equipment, such as the mixer, the CD player, and the DVD player, on the computer 200. These are realized by reading the computer program in the embodiment into the computer 200 and executing the computer program. Then, a processing circuit block included in the mixer, the CD player, and the DVD player or the like, which is generally realized as a physical circuit, such as an IC and a LSI, or which is functionally realized on the IC or the LSI or the like, is realized as functional blocks on the CPU 201 provided for the computer 200.

Now, with reference to FIG. 3, of the functional blocks realized on the CPU 201 in the optical disc reproduction system 1 in the embodiment, the functional blocks for displaying the BPM value on the BPM display portion 13 of the player menu 11 will be explained in detail. FIG. 4 is a block diagram conceptually showing the functional blocks for displaying the BPM value on the BPM display portion 13 of the player menu 11.

As shown in FIG. 3, on the CPU 201, a BPM measurement block 211, a multiplication block 212, a TAP signal detection block 213, a BPM reference value setting block 214, and a comparison block 215 are realized as the functional blocks for displaying the BPM value on the BPM display portion 13 of the player menu 11.

The BPM measurement block 211 is adapted to obtain the content data which is currently a reproduction target and measure its BPM value. Incidentally, in the embodiments below, the BPM value measured on the BPM measurement block 211 is referred to as a "BPM candidate value", as occasion demands, for explanation.

The multiplication block 212 is adapted to multiply the BPM value measured on the BPM measurement block 211 (i.e. the BPM candidate value) by a predetermined coefficient. The BPM candidate value obtained by the multiplication by the predetermined coefficient is outputted to the comparison block 215. Incidentally, in the embodiments below, the BPM candidate value obtained by the multiplication by the predetermined coefficient is also referred to as the BPM candidate value for explanation.

The TAP signal detection block 213 is adapted to detect the pressing of the TAP button 14 of the player menu 11 and output a detection signal to the BPM reference value setting block 214.

The BPM reference value setting block 214 sets a BPM reference value used to determine (or extract) a BPM definite value explained later from among the BPM candidate value, on the basis of the detection signal outputted from the TAP signal detection block 213. Specifically, it sets the BPM value indicated by the detection signal, as the BPM reference value. However, it may set the BPM value after predetermined operation or calculation is preformed on the BPM value indicated by the detection signal, as the BPM reference value.

The comparison block 215 compares the BPM candidate value outputted from the multiplication block 212 with the BPM reference value outputted from the BPM reference value setting block 214, and outputs the BPM definite value which is the BPM value actually displayed on the BPM display device 13 from the BPM candidate value. The CPU 201 actually displays the BPM definite value outputted from the comparison block 215, on the BPM display portion 13 of the player menu 11.

Incidentally, the operation of each block shown in FIG. 3 (specifically, a method of measuring the BPM value on the BPM measurement block 211, a method of multiplication on the multiplication block 212, a method of setting the BPM reference value on the BPM reference value setting block 214, a method of comparison on the comparison block, or the like) will be described in detail later (refer to FIG. 4 or the like).

(2) Operation Principle

Next, with reference to FIG. 4 to FIG. 11, the operation principle of the optical disc reproduction system 1 in the embodiment will be explained. Here, an entire flow of the operation principle of the optical disc reproduction system 1 in the embodiment will be explained with reference to FIG. 4, and a more detailed explanation will be given with reference to FIG. 5 to FIG. 11, as occasion demands. FIG. 4 is a flowchart conceptually showing a flow of the operations of the optical disc reproduction system in the embodiment.

Incidentally, FIG. 4 explains the operation performed in parallel with the reproduction of the content data. More specifically, FIG. 4 explains the operation when the BPM value is displayed on the BPM display portion 13 of the player menu 11. Therefore, although FIG. 4 does not clearly show that the content data is reproduced, it is assumed that the content data is obviously reproduced when the operation shown in FIG. 4 is performed.

As shown in FIG. 4, firstly, by the operation of the BPM measurement block 211, the BPM value (i.e. BPM candidate value) of the currently reproduced content data is measured (step S101). In other words, without the user's operation, the BPM value (i.e. BPM candidate value) of the currently reproduced content data is so-called automatically measured.

Now with reference to FIG. 5 and FIG. 6, the method of measuring the BPM value in the step S101 in FIG. 4 will be explained in more detail. FIG. 5 is a graph conceptually showing a reproduction waveform of content data. FIG. 6 is a graph conceptually showing a reproduction waveform of the content data divided in each frequency band.

As shown in FIG. 5, if the content data is reproduced, a reproduction signal which is relatively strong (i.e. with large amplitude) is obtained at a position where the beat appears (i.e. the beat position). In other words, a reproduction signal which is relatively strong at the beat position. The inverse number of the average of the intervals of the beat positions (i.e. beat interval) in each certain section is the BPM candidate value. For example, if the average of the interval of the beat positions is 400 (msec), the BPM candidate value is obtained by the following equation.

$$BPM\ \text{candidate value} = \frac{1}{400 \times 10^{-3}} \times 60 = 150\,\text{BPM} \qquad \text{[Equation 1]}$$

As shown in FIG. 6, in the embodiment, the reproduction signal of the content data is divided in each frequency band, and the BPM candidate value of a signal component in each frequency band is measured. Specifically, the BPM candidate value of the signal component in each of lower (low frequency band), middle (middle frequency band), and higher (higher frequency band) ranges is measured. In FIG. 6, it is measured such that the BPM candidate value of the signal component in the lower range is "a", that the BPM candidate value of the signal component in the middle range is "b", and that the BPM candidate value of the signal component in the higher range is "c".

In FIG. 4 again, then the entire content data is divided into a plurality of reproduction sections, on the basis of the BPM candidate value measured in the step S101 (step S102). Here, for example, the entire content data is divided into a plurality of reproduction sections whose boundary is a portion where the BPM candidate value significantly changes.

The aspect of dividing into the plurality of reproduction sections will be explained in more detail with reference to FIG. 7. FIG. 7 is an explanatory diagram conceptually showing the entire content data is divided into the plurality of reproduction sections on the basis of the BPM candidate value.

As shown in FIG. 7, the entire content data is divided into five reproduction sections on the basis of the measured BPM candidate value. Specifically, the content data is divided into: a reproduction section #1 in which the BPM candidate value is about 120; a reproduction section #2 in which the BPM candidate value is about 130; a reproduction section #3 in which the BPM candidate value is about 90; a reproduction section #4 in which the BPM candidate value is about 120; and a reproduction section #5 in which the BPM candidate value is about 100. The determination of the BPM definite value (or correction of the BPM candidate value) explained below is performed in each of the reproduction sections.

Incidentally, the measurement of the BPM candidate value in the step S101 is performed in parallel with the reproduction of the content data, so that it is only necessary to divide into the reproduction sections along with the reproduction of the content data. That is, it is not always necessary to divide the entire content data into the plurality of reproduction sections before the reproduction of the content data. Specifically, for example, it is only necessary to identify the boundary of the reproduction section #1 and the reproduction section #2 or other reproduction sections shown in FIG. 7, in parallel with the reproduction of the content data.

In FIG. 4 again, then it is judged whether or not the BPM value is measured in the step S101 (step S103). That is, it is judged whether or not the beat position shown in FIG. 5 and FIG. 6 or the like can be preferably recognized and the BPM candidate value can be recognized on the basis of the recognized beat position.

As the result of the judgment, if it is judged that the BPM candidate value is not measured (the step S103: No), a warning statement or the like which indicates that the BPM candidate value cannot be measured is displayed (step S104), and the operational flow returns to the step S101 to continue the measurement of the BPM candidate value. On the other hand, if it is judged that the BPM candidate value is measured (the step S103: Yes), then the BPM candidate value measured in the step S101 is displayed on the BPM display portion 13 of the player menu 11 (step S105).

Then it is judged whether or not there is a TAP operation (step S115) by the user (step S106). Specifically, for example, it is judged whether or not the user operates the mouse 302 or the like, displaces the pointer 50 on the TAP button 14 and performs the click operation, to thereby press the TAP button 14.

As a result of the judgment, if it is judged that there is no TAP operation (the step S106: No), the operational flow goes to a step S112.

On the other hand, if it is judged that there is a TAP operation (the step S106: Yes), the BPM value calculated from the beat interval is set as the BPM reference value, on the basis of the beat interval given by the TAP operation, by the operation of the BPM reference value setting block 214 (step S107).

The setting of the BPM reference value will be explained in more detail with reference to FIG. 8. FIG. 8 are graphs conceptually showing the waveforms of the detection signal by the TAP operation.

As shown in FIG. 8(*a*), if the user presses the TAP button 14, the detection signal in which a pulse-shaped waveform appears in accordance with the pressing is detected, for example, on the TAP signal detection block 213. At this time, the user presses the TAP button 14 in accordance with the beat of the reproduced content data (in other words, in accordance with the rhythm of the content data). Therefore, the pulse-shaped waveform which appears in accordance with the pressing of the TAP button 14 substantially matches the beat position of the content data, and the interval of the pulse-shaped waveforms corresponds to the beat interval. Thus, by the operation of the BPM reference value setting block 214, the inverse number of the interval of the pulse-shaped waveforms (i.e. 1/T1) is set as the BPM reference value. At this time, in order to set the BPM reference value, the interval of the pulse-shaped waveforms is required, so that the user needs to press the TAP button 14 at least twice.

Incidentally, it is the user that presses the TAP button 14. Thus, the pulse-shaped waveforms do not always appear at even intervals. In this case, the inverse number of the average of the intervals of the pulse-shaped waveforms is preferably set as the BPM reference value. Specifically, if the pulse-shaped waveforms appear at waveform intervals of T1 millisecond, T2 milliseconds, T3 milliseconds, and T4 milliseconds, the BPM reference value is set by the following equation.

$$BPM\ \text{candidate value} = \frac{1}{\frac{(T1+T2+T3+T4)}{4}\times 10^{-3}}\times 60 \quad \text{[Equation 2]}$$

In FIG. 4 again, then the BPM reference value set in the step S107 is displayed on the BPM display portion 13 of the player menu 11 (step S108). That is, instead of the BPM candidate value measured in the step S101, the BPM reference value set in the step S107 is displayed on the BPM display portion 13 of the player menu 11.

Then, it is judged whether or not to perform the determination operation of determining the BPM definite value (in other words, an operation corresponding to one specific example of the "determining process" of the present invention and modification of the BPM value displayed on the BPM display portion 13) on the basis of the BPM candidate value set in the step S107 (step S109).

As a result of the judgment, if it is judged that the determination of the BPM value is not performed (the step S109: No), the operation flow goes to a step S102. In this case, the BPM display portion 13 displays the BPM reference value calculated in the step S107 or the BPM candidate value measured in the step S101. In other words, the BPM reference value set in the step S107 or the BPM candidate value measured in the step S101 is determined to be the BPM definite value.

On the other hand, if it is judged that the determination operation of the BPM value is performed (the step S109: Yes), the determination operation of determining the BPM value is performed (step S110).

After that, the BPM definite value outputted as a result of the determination operation of the BPM value in the step S110 is displayed on the BPM display portion 13 of the player menu 11 (step S111). That is, instead of the BPM candidate value measured in the step S101 and the BPM reference value set in the step S107, the BPM definite value outputted as a result of the determination operation of the BPM value in the step S110 is displayed on the BPM display portion 13 of the player menu 11.

Now, with reference to FIG. 9 to FIG. 11, the determination operation of determining the BPM value in the step S110 will be explained in more detail. FIG. 9 is a flowchart conceptually snowing a flow of the determination operation of determining the BPM value. FIG. 10 is a flowchart showed by using specific values in the flowchart shown in FIG. 9. FIG. 11 is a graph generally showing the BPM candidate value, the BPM reference value, and a numerical relationship between an upper limit and a lower limit set on the basis of the BPM reference value.

As shown in FIG. 9, firstly, the BPM candidate value measured in the step S101 in FIG. 4 is multiplied by the predetermined coefficient by the operation of the multiplication block 212 (step S201). That is, the operation corresponding to one specific example of the "correcting process" of the present invention is performed. As the predetermined coefficient, for example, ½, ⅔, 1, 3/2, 2, or the like is used. The BPM candidate value multiplied by the predetermined coefficient (i.e. the multiplied BPM candidate value) is outputted to the comparison block 215 with the BPM candidate value measured in the step S101 (in other words, a new BPM candidate value multiplied by the predetermined coefficient of 1), as the new BPM candidate value.

Then, by the operation of the comparison block 215, the BPM candidate value multiplied by the predetermined coefficient in the step S201 is compared with the BPM reference value set in the step S107 in FIG. 4 (i.e. the BPM value set by the TAP operation) (step S202). Specifically, with regard to the BPM candidate value multiplied in the step S201 and the BPM reference value set in the step S107 in FIG. 4, their inequality is compared, and their difference in size or the like is calculated.

After that, on the basis of the comparison result in the step S202, the BPM candidate value with the minimum difference from the BPM reference value is extracted from among the multiplied BPM candidate value (step S203). The extracted BPM candidate value is the BPM definite value displayed on the BPM display portion 13 of the player menu 11 in the step S111 in FIG. 4.

Now by using specific numerical values, an explanation will be given on the operation in FIG. 9. As shown in FIG. 10, it is assumed that "96" (i.e. 625 milliseconds as the beat interval) is measured as the BPM candidate value of the lower-range signal component on the BPM measurement block 211, "120" (i.e. 500 milliseconds as the beat interval) as the BPM candidate value of the middle range signal component, and "150" (i.e. 400 milliseconds as the beat interval) as the BPM candidate value of the higher-range signal component.

On the other hand, it is assumed that the BPM reference value is set to "125" (i.e. the interval of the pulse-shaped waveforms is 480 milliseconds) on the BPM reference value setting block 214 by the user pressing the TAP button 14.

At this time, on the multiplication block 212, each of "96" which is the BPM candidate value of the higher-range signal component, "120" which is the BPM candidate value of the middle-range signal component, and "150" which is the BPM candidate value of the lower-range signal component is multiplied by each of the predetermined coefficients of ½, ⅔, 1, 3/2, and 2. Specifically, by multiplying "150", which is the BPM candidate value of the lower-range signal component, by the predetermined coefficient, "75", "100", "150", "225", and "300" are outputted to the comparison block 215 as the new BPM candidate value. By multiplying "120", which is the BPM candidate value of the middle-range signal component, by the predetermined coefficient, "60", "80", "120", "180", and "240" are outputted to the comparison block 215 as the new BPM candidate value. By multiplying "96", which is the BPM candidate value of the higher-range signal component, by the predetermined coefficient, "48", "64", "96", "144", and "192" are outputted to the comparison block 215 as the new BPM candidate value.

After that, "120" which is the BPM candidate value with the minimum difference from the BPM reference value of "125" is determined to be the BPM definite value on the comparison block 215.

Incidentally, it can be said that the BPM reference value sets an acceptable range of the BPM definite value. For example, as shown in FIG. 11 which shows the inequality between the BPM reference value and the BPM candidate value multiplied by the predetermined coefficient on a number line, it can be said that the upper limit of the acceptable range of the BPM reference value is determined to be (BPM reference value)+(BPM reference value×50%)=125+125×0.5=187.5 and the lower limit of the acceptable range of the BPM reference value is determined to be (BPM reference value)−(BPM reference value×30%)=125−125×0.3=87.5, on the basis of the BPM reference value.

If there is one BPM candidate value in the acceptable range, the BPM reference value may be determined to be the BPM definite value.

If there are a plurality of BPM candidate values in the acceptable range, the BPM candidate value with the minimum difference from the BPM reference value from among the BPM candidate values included in the acceptable range may be determined to be the BPM definite value. Alternatively, the actual beat position, which is detected by analyzing the reproduction signal of the content data, is detected and analyzed, and the BPM candidate value that is estimated to preferably indicate the actual BPM value of the content data from the detection/analysis result of the beat position may be determined to be the BPM definite value.

In any case, the BPM candidate value beyond the acceptable range does not have to be compared with the BPM reference value. Thus, it is possible to reduce the processing load of the CPU 201.

In this case, the upper limit and the lower limit of the acceptable range of the BPM definite value set on the basis of the BPM reference value may be set at a fixed ratio or a variable (or changeable) ratio for the BPM reference value. If the limits are set at the variable (or changeable) ratio for the BPM reference value, the setting may be performed at a predetermined ratio by the judgment of the CPU 201. Alternatively, the setting may be performed on the basis of the user's input through the operation key 16. For example, if it is desired to reduce the number of the BPM candidate values in the acceptable range, the ratio for the BPM reference value is preferably set so as to keep the upper limit and the lower limit as close to the BPM reference value as possible. On the other hand, if it is desired to increase the number of the BPM candidate values in the acceptable range to determine the BPM definite value by preferably performing the subsequent comparison of the inequality or the like, the ratio for the BPM reference value is preferably set so as to keep the upper limit and the lower limit as far away from the BPM reference value as possible. In any case, as the ratio of the upper limit and the lower limit of the acceptable range of the BPM definite value with respect to the BPM reference values, a more appropriate predetermined value is preferably specified, individually and specifically (e.g. in accordance with the number and scattering of the BPM candidate values, or a numerical relationship or the like between the BPM candidate value and the BPM reference value), by using simulations, theoretically, mathematically, experientially, or experimentally, in accordance with e.g. the characteristic or the like of the BPM value.

However, if there is no BPM candidate value in the acceptable range, the BPM reference value may be determined to be the BPM definite value as it is. Alternatively, the type of the coefficient used on the multiplication block 212 may be increased to generate the new BPM candidate value.

In FIG. 4 again, after that, it is judged whether or not the reproduction of the content data is ended in one reproduction section of the reproduction sections divided in the step S102 (step S112). In other words, it is judged whether or not there is a significant change in the measured BPM value or the like. Specifically, for example, if the content data is reproduced in the reproduction section #1 in FIG. 7, it is judged whether or not the reproduction of the content data is ended in the reproduction section #1. Alternatively, it is judged whether or not the reproduction section that is a current reproduction target is changed from the reproduction section #1 to the reproduction section #2.

As a result of the judgment, if it is judged that the reproduction of the content data is not ended (in other words, the measured BPM value or the like is not significantly changed) in one reproduction section (the step S112: No), the operational flow returns to the step S106 again to continue the determination operation of the BPM value on the basis of the BPM reference value if needed.

On the other hand, if it is judged that the reproduction of the content data is ended (in other words, the measured BPM value or the like is significantly changed) in one reproduction section (the step S112: Yes), then it is judged whether or not to start the reproduction of the content data in the next reproduction section (step S113).

As a result of the judgment, if it is judged to start the reproduction of the content data in the next reproduction section (the step S112: Yes), in parallel with the reproduction of the content data in the next reproduction section (step S114), the operations from the step S103 to the step S112 described above are repeatedly performed again on the next reproduction section. Specifically, if the reproduction in the reproduction section #2 is started after the reproduction in the reproduction section #1 is ended, the BPM candidate value is measured, the BPM reference value is set, and the BPM definite value is determined even in the reproduction section #2, as in the reproduction section #1, and in the end, the BPM definite value in the reproduction section #2 is presented to the user.

On the other hand, if it is judged not to start the reproduction of the content data in the next reproduction section (in other words, to end the reproduction of the content data) (the step S112: No), the reproduction of the content data is ended.

As explained above, in the embodiment, by using the BPM reference value set in accordance with the user's input and correcting the automatically measured BPM candidate value if needed (i.e. generating the new BPM candidate value by multiplying the BPM candidate value by the predetermined coefficient), it is possible to determine the BPM definite value. By this, it is possible to present the BPM value which indicates the more correct or highly accurate beat rate, to the user. In particular, if the automatically measured BPM candidate value does not meet the user's expectation (i.e. the more correct or highly accurate beat rate is not measured) or in similar cases, the user who reproduces the content data performs an input in accordance with the characteristic of the content data, to thereby set the BPM reference value according to the characteristic of the content data. As a result, it is possible to set the BPM definite value presented to the user in the end, to the value that meets the user's expectation. In this regard, the computer 200 provided with the computer program in the embodiment (more specifically, the optical disc reproduction system 1 provided with the computer 200) is particularly effective. Moreover, since the BPM reference value set in accordance with the user's input is used, it is possible to effectively avoid such a disadvantage that the incorrect BPM value is presented to the user because it is influenced by the characteristic of the content data including the music song. By this, it is possible to reproduce the plurality of content data in a row or with them overlapping, without bothering the user by an uncomfortable feeling, in the mixing operation.

In addition, since the BPM candidate value measured on the BPM measurement block 211 can be multiplied by the predetermined coefficient by the operation of the multiplication block 212, it is possible to preferably avoid such a disadvantage that the BPM value including an error, such as ½ times, twice, and ⅔ times of the correct or highly accurate BPM value, is possibly presented to the user because the beat is overlooked or it is falsely recognized that there is the beat on the BPM measurement block 211 or for similar reasons.

Incidentally, it may be constructed to output the BPM candidate value measured on the BPM measurement block 211 to the comparison block 215 as it is, without multiplying the BPM candidate value by the predetermined coefficient on the multiplication block 212. For example, if the BPM candidate value and the BPM reference value are significantly different or in similar cases, the BPM candidate value may be selectively multiplied by the predetermined coefficient. Specifically, if "120" is measured as the BPM candidate value and "120" is generally set as the BPM reference value, the BPM candidate value does not have to be multiplied by the predetermined coefficient. Alternatively, if "60" is measured as the BPM candidate value and "120" is generally set as the BPM reference value, the BPM candidate value may be multiplied by the predetermined coefficient. In this case, it is preferable to selectively use the predetermined coefficient that gives a value close to the BPM reference value after the multiplication of the BPM candidate value. Even in such construction, it is possible to present the BPM value which indicates the relatively correct or highly accurate beat rate, to the user.

Moreover, in the aforementioned embodiment, the BPM candidate value is multiplied by the predetermined coefficient in the timing to determine the BPM definite value. It is obvious, however, that the timing to multiply the BPM candidate by the predetermined coefficient is not limited to this. The BPM candidate value may be multiplied by the predetermined coefficient in any timing that can preferably determine the BPM definite value. For example, the BPM candidate value may be multiplied by the predetermined coefficient in the timing to measure the BPM candidate value in the step S101 in FIG. 4. Specifically, if "120" is measured as the BM candidate value in the step S101 in FIG. 4, the multiplication may be performed by "½" or "2" as the predetermined coefficient at this time point. In this case, the BPM definite value may be determined when the BPM reference value is set in the step S107 in FIG. 4.

Moreover, the BPM candidate value may be measured by using the reproduction signal of the content data including the signal components in all the frequency bands, without dividing the reproduction signal of the content data in each frequency band.

Moreover, the BPM reference value set by the user pressing the TAP button 14 may be displayed on the BPM display portion 13 as it is, without performing the determination operation of the BPM value. In such construction, if the user can set the BPM value which is more correct or highly accurate than the BPM value measured on the BPM measurement block 211, the BPM value set by the user can be displayed on the BPM display portion 13. This is effectively particularly when the user has a skilled or high ability. Incidentally, in this case, it is preferable to change whether the BPM candidate value is corrected or the BPM reference value is displayed on the BPM display portion 13 as it is, by using e.g. a certain button of the operation key 16.

(3) Information Reproducing Apparatus

Next, an explanation will be given on an optical disc reproducing apparatus which realizes the optical disc reproduction system 1 in the embodiment described above as an exclusive hardware apparatus, with reference to FIG. 12. In other words, an explanation will be given on the optical disc reproducing apparatus as the exclusive hardware apparatus, which has the same function as that of the optical disc reproduction system 1 realized on the commercial computer 200. FIG. 12 is a block diagram conceptually showing the basic structure of an optical disc reproducing apparatus 500 in an embodiment.

As shown in FIG. 12, the optical disc reproducing apparatus 500 is provided with: an optical pickup (PU: Pick Up) 510; a RF (Radio Frequency) amplifier 511; a spindle motor 512; a servo mechanism 513; a pickup servo circuit 514; a content data decode device 515; a decoding device 516; a control data decode device 517; a spindle servo circuit 518; an external output terminal 519; a system controller 520; an operation device 540; and a display device 550.

The optical pickup 510 is intended to read the content data and control data from the optical disc, and it is provided with a semiconductor laser apparatus, various lenses, an actuator and the like. More specifically, the optical pickup 510 irradiates laser light LB to the optical disc with a predetermined power. Moreover, the optical pickup 510 is provided with a PD (Photo Detector) sensor for receiving reflected light of the laser light LB from the optical disc, and it outputs the received reflected light as a reading signal to the RF amplifier 511.

The optical pickup 510 can be displaced in a radial direction or the like of the optical disc in accordance with a tracking error signal, by using a not-illustrated actuator, slider, or the like, which is driven by the control of the servo mechanism 513. In addition, the optical pickup 510 can be focus-controlled by changing the focal point of the laser light LB in accordance with a focus error signal by the control of the servo mechanism 513.

The RF amplifier 511 generates a RF signal on the basis of the reading signal outputted from the optical pickup 510 and outputs the generated RF signal to each of the content data decode device 515 and the control data decode device 517. Moreover, the RF amplifier 511 generates an error signal, such as the focus error signal for controlling the focus when the optical pickup 510 irradiates the laser light LB to the optical disc and the tracking error signal for controlling the tracking when the optical pickup 510 irradiates the laser light LB to the optical disc, on the basis of the reading signal outputted from the optical pickup 510. The generated error signal is outputted to the pickup servo circuit 514.

The spindle motor 512 is adapted to rotate the optical disc at a predetermined speed under spindle servo by the spindle servo circuit 518.

The servo mechanism 513 displaces the optical pickup 510 in the radial direction of the optical disc on the basis of a tracking servo control signal outputted from the pickup servo circuit 514. Moreover, the servo mechanism 513 displaces an objective lens included in the optical pickup 510 along the optical axis of the laser light LB on the basis of a focus servo control signal outputted from the pickup servo circuit 514.

The pickup servo circuit 514 generates the focus servo control signal and the tracking servo control signal for controlling the servo mechanism 513, on the basis of the error signal outputted from the RF amplifier 511. The generated focus servo control signal and tracking servo control signal are outputted to the servo mechanism 513. In other words, in order to prevent a focus error and a tracking error from occurring, the servo mechanism 513 is feedback-controlled on the basis of the error signal outputted from the RF amplifier 511.

The content data decode device 515 decodes the RF signal outputted from the RF amplifier 511 to thereby generate a stream signal including a video stream and an audio stream. The generated stream signal is outputted to the decoding device 516.

The decoding device 516 decodes the stream signal outputted from the content data decode device 515 to thereby generate a reproduction signal. The generated reproduction signal is outputted to external output equipment, such as a display and a speaker, through the external output terminal 519, and it is reproduced as video images and audio according to the content data recorded on the optical disc.

Incidentally, after a predetermined modulation process is performed on the reproduction signal outputted from the decoding device 516, the modulated reproduction signal may be outputted to the external output equipment. More specifically, modulation by a sawtooth wave may be performed on the reproduction signal, or modulation by a rectangular wave may be performed on the reproduction signal. For example, modulation which causes the Doppler effect may be performed. For example, modulation by a special waveform which imitates the sound of a jet plane may be performed. For example, modulation by a special waveform which imitates the bark of a gun may be performed. For example, modulation by various special waveforms set in advance by the user or the like may be performed. These modulation are preferably performed by the user operating not-illustrated operation keys on the operation device 540.

The control data decode device 517 decodes the RF signal outputted from the RF amplifier 511 to thereby generate the control data for controlling the reproduction of the content data. The control data includes TOC data or the like recorded in a lead-in area of the optical disc, synchronization data recorded and included in the stream signal, and sub-code data or the like including time-elapse information when the content data is reproduced, as one specific example. The generated control data is outputted to the system controller 520 and is used to control the reproduction of the content data.

The spindle servo circuit 518 detects an error in the synchronization data with respect to the rotational speed of the spindle motor 512 instructed from the system controller 520, and feedback-controls the rotation of the spindle motor 512 in order to prevent the error from occurring.

The system controller 520 is provided with a micro processor (MPU), and it performs central control on the entire operation of the optical disc reproducing apparatus 500 by executing a system program set in advance.

Moreover, the system controller 520 is connected with the operation device 540 and the display device 550. Instruction data from various operation keys disposed on the operation device 540 is outputted to the system controller 520, and the system controller 520 controls the reproduction of the control data in accordance with the instruction data. Moreover, the system controller 520 controls the display operation of the display device 550.

The operation device 540 is provided with: a jog dial 541; an angular velocity detection device 542; and a TAP button 543.

The jog dial 541 is a disc-shaped operation key which can be operated directly by the user and which can be physically rotated in the both directions. The jog dial 541 has the same function as that of the jog dial 17 of the player menu 11 described above.

The angular velocity detection device 542 detects the rotational direction and the rotational speed (angular velocity) of the jog dial 541. More specifically, the angular velocity detection device 542 is provided with a rotary encoder circuit and optically detects the rotational direction and the rotational speed of the jog dial 541. The detected rotational direction and rotational speed of the jog dial 541 are outputted to the system controller 520. By this, the system controller 520 recognizes the amount of operating the jog dial 541 operated by the user or the like to perform an effect process according to the operation amount.

The TAP button 543 can be operated directly by the user and can be pressed. The TAP button 543 has the same function as that of the TAP button 14 of the player menu 11 described above.

The display device 550 displays various information which accompany the reproduction of the content data. The display device 550 is provided with a display panel, such as a liquid crystal display and a fluorescent tube, and displays the various information under the control of the system controller 520. Specifically, the display device 550 displays the BPM value or the like.

Even in the optical disc reproducing apparatus 500 as the exclusive hardware apparatus, the same benefits as those in the aforementioned optical disc reproduction system 1 can be received by performing the aforementioned operations (specifically, the operations explained in FIG. 4 to FIG. 11), under the control of the system controller 520/

Incidentally, out of the constituent elements of the optical disc reproducing apparatus 500, mainly the optical pickup 510, the RF amplifier 511, the spindle motor 512, the servo mechanism 513, the pickup servo circuit 514, and the spindle servo circuit 518 are substantially the same as those in the structure in the optical disc drive 500 in the aforementioned optical disc reproduction system 1. Moreover, out of the constituent elements of the optical disc reproducing apparatus 500, mainly the content data decode device 515, the decoding device 516, the control data decode device 517, and the system controller 520 are realized as the function block on the computer 200 (specifically, the CPU 201 in the computer 200) in the aforementioned optical disc reproduction system 1. Therefore, it can be said that the optical disc reproducing apparatus 500 and the optical disc reproduction system 1 are basically the same apparatus.

In the aforementioned embodiments, the optical disc reproduction system and apparatus are explained as one example of the information reproducing apparatus. The present invention, however, is not limited to the optical disc and the reproduction system and apparatus thereof. The present invention can be also applied to other various information recording media which support high-density recording and high transmission rate and the player thereof.

The present invention is not limited to the aforementioned embodiments, but various changes may be made without departing from the essence or spirit of the invention which can be read from the claims and the entire specification. An information reproducing apparatus and method and a computer program, which involve such changes, are also intended to be within the technical scope of the present invention.

INDUSTRIAL APPLICABILITY

The computer program and the information reproducing apparatus and method according to the present invention can be applied to an information reproducing apparatus, such as a DVD player. Moreover, they can be also applied to an information reproducing apparatus or the like which can be mounted on or which can be connected to various computer equipment for commercial use or for business use.

The invention claimed is:

1. A non-transitory computer-readable medium recording thereon a computer program for making a computer perform:

a measuring process of measuring a beat candidate value, which is the number of beats of content per unit time;

a reference setting process of setting a beat reference value, whose unit is a BPM (Beat Per Minute), according to a user's input which is a TAP operation;

a determining process of determining a beat definite value set in the vicinity of the beat reference value and set in a range of an upper limit to a lower limit which are set on the basis of the beat reference value, from among the measured beat candidate value;

a ratio setting process of variably setting a ratio between each of the upper limit and the lower limit and the beat reference value; and a displaying process of displaying at least one of the beat candidate value, the beat reference value and the beat definite value.

2. The non-transitory computer-readable medium according to claim 1, wherein the upper limit is set by adding M % of the beat reference value to the beat reference value, M being a positive real number, and the lower limit is set by subtracting N % of the beat reference value from the beat reference value, N being a positive real number.

3. The non-transitory computer-readable medium according to claim 1, wherein said measuring process measures a plurality of beat candidate values in each of frequency bands of the content, and said determining process determines a beat candidate value having a minimum difference from the beat reference value from among the plurality of beat candidate values, as the beat definite value.

4. The non-transitory computer-readable medium according to claim 1, further making the computer perform a correcting process of correcting the beat candidate value, to thereby generate a new beat candidate value.

5. The non-transitory computer-readable medium according to claim 4, wherein said correcting process corrects the beat candidate value, if needed, on the basis of a relationship between the beat candidate value and the beat reference value.

6. The non-transitory computer-readable medium according to claim 4, wherein said correcting process multiplies the beat candidate value measured in said measuring process by a predetermined coefficient, to thereby generate the new beat candidate value.

7. The non-transitory computer-readable medium according to claim 6, wherein the predetermined coefficient is at least one of ½, ⅔, 1, 3/2, and 2.

8. The non-transitory computer-readable medium according to claim 1, wherein the user's input is a pulse outputted by pressing an operation key a plurality of times in desired timing, and said reference value setting process sets an inverse number of an average cycle of the pulse, as the beat reference value.

9. The non-transitory computer-readable medium according to claim 1, further making the computer perform a dividing process of dividing the content into a plurality of sections along a time axis, on the basis of the beat candidate value, said determining process determining the beat definite value in each of the divided sections.

10. The non-transitory computer-readable medium according to claim 1, further making the computer perform a changing process of changing an operation in said determining process such that the beat reference value is determined to be the beat definite value in said determining process.

11. The non-transitory computer-readable medium according to claim 1, wherein the content includes music song content.

12. An information reproducing apparatus comprising:

a measuring device for measuring a beat candidate value, which is the number of beats of content per unit time;

a reference setting device for setting a beat reference value, whose unit is a BPM (Beat Per Minute), according to a user's input which is a TAP operation;

a determining device for determining a beat definite value set in the vicinity of the beat reference value and set in a range of an upper limit to a lower limit which are set on the basis of the beat reference value, from among the measured beat candidate value;

a ratio setting device for variably setting a ratio between each of the upper limit and the lower limit and the beat reference value; and a displaying device for displaying at least one of the beat candidate value, the beat reference value and the beat definite value.

13. The information reproducing apparatus according to claim 12, further comprising an inputting device for receiving the user's input.

14. The information reproducing apparatus according to claim 12, wherein said inputting device comprises an operation key which can be pressed a plurality of times in desired timing.

15. An information reproducing method comprising:

measuring, via an information reproducing apparatus, a beat candidate value, which is the number of beats of content per unit time;

setting, via the information reproducing apparatus, a beat reference value, whose unit is a BPM (Beat Per Minute), according to a user's input which is a TAP operation; and determining, via the information reproducing apparatus, a beat definite value set in the vicinity of the beat reference value and set in a range of an upper limit to a lower limit which are set on the basis of the beat reference value, from among the measured beat candidate value;

variably setting, via the information reproducing apparatus, a ratio between each of the upper limit and the lower limit and the beat reference value; and displaying, via the information reproducing apparatus, at least one of the beat candidate value, the beat reference value and the beat definite value.

* * * * *